(12) United States Patent
Chan et al.

(10) Patent No.: US 10,673,904 B2
(45) Date of Patent: *Jun. 2, 2020

(54) DATA SECURITY SYSTEM

(71) Applicant: International Business Machines Corporation, Armonk, NY (US)

(72) Inventors: Yuk L. Chan, Rochester, NY (US); Heidi Lagares-Greenblatt, Jefferson Hills, PA (US); Deppti M. Naphade, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/932,427

(22) Filed: Nov. 4, 2015

(65) Prior Publication Data

US 2017/0091481 A1 Mar. 30, 2017

Related U.S. Application Data

(63) Continuation of application No. 14/870,690, filed on Sep. 30, 2015.

(51) Int. Cl.
*H04L 29/06* (2006.01)
*G06F 16/903* (2019.01)
(Continued)

(52) U.S. Cl.
CPC .......... *H04L 63/205* (2013.01); *G06F 16/903* (2019.01); *G06F 16/9535* (2019.01); *G06F 21/6245* (2013.01); *H04L 63/04* (2013.01)

(58) Field of Classification Search
CPC ....... H04L 63/205; H04L 63/20; H04L 63/10; H04L 63/1441; H04L 63/04; G06F 17/3094; G06F 21/6245; G06F 21/60; G06F 9/4451; G06F 21/00; G06F 21/6254; G06F 21/121; G06F 17/30864; G06F 21/577;
(Continued)

(56) References Cited

U.S. PATENT DOCUMENTS 6,336,117 B1  1/2002  Massarani
7,093,287 B1  8/2006  Gusler et al.
(Continued)

FOREIGN PATENT DOCUMENTS

CA  2730269 A1  1/2010
CN  104541475 A  4/2015
GB  2435570 A  8/2007

OTHER PUBLICATIONS

Abine, "Protect your privacy with Blur from Abine," Abine Products, p. 1-6, Abine Inc., https://www.abine.com/index.html, Accessed on Sep. 30, 2015.
(Continued)

*Primary Examiner* — Khang Do
*Assistant Examiner* — Feliciano S Mejia
(74) *Attorney, Agent, or Firm* — Anthony M. Pallone

(57) ABSTRACT

A computer identifies one or more privacy settings. The computer receives a query for information. The computer determines whether a response to the query satisfies the one or more privacy settings. If the computer determines that the response to the query does not satisfy the one or more privacy settings, the computer alters the response to satisfy the one or more privacy settings.

10 Claims, 3 Drawing Sheets

(51) Int. Cl.
 *G06F 16/9535* (2019.01)
 *G06F 21/62* (2013.01)
(58) Field of Classification Search
 CPC ......... G06F 17/30867; G06F 17/30964; G06F 21/51; H04W 12/02; H04W 12/08
 USPC .............. 726/1, 4, 26–27; 705/325; 713/154
 See application file for complete search history.

(56) References Cited

U.S. PATENT DOCUMENTS

| | | | |
|---|---|---|---|
| 8,122,079 B2 | 2/2012 | Van Assche | |
| 8,166,534 B2 | 4/2012 | Yariv et al. | |
| 8,321,958 B1 * | 11/2012 | Fleming | G06F 21/51 726/29 |
| 8,578,487 B2 * | 11/2013 | Soeder | G06F 21/554 726/1 |
| 8,646,032 B2 * | 2/2014 | Aad | G06F 21/604 726/1 |
| 8,650,640 B2 | 2/2014 | Calcaterra et al. | |
| 8,689,293 B2 * | 4/2014 | Iida | G06F 21/6245 726/28 |
| 8,775,206 B2 * | 7/2014 | Kulkarni | G06F 21/6245 705/2 |
| 8,799,990 B2 * | 8/2014 | Hu | H04L 63/0227 726/1 |
| 8,826,446 B1 | 9/2014 | Liu | |
| 8,826,496 B2 * | 9/2014 | Niu | G02C 5/146 16/228 |
| 8,918,895 B2 | 12/2014 | Agrawal et al. | |
| 9,003,480 B2 | 4/2015 | Barney et al. | |
| 9,060,239 B1 | 6/2015 | Sinha et al. | |
| 9,147,012 B2 * | 9/2015 | Gaude | G06F 16/9535 |
| 9,213,772 B2 * | 12/2015 | Hariharan | G06F 17/30867 |
| 9,305,163 B2 * | 4/2016 | Murphy | G06F 21/44 |
| 9,311,496 B1 * | 4/2016 | Dutch | G06F 21/604 |
| 9,460,303 B2 * | 10/2016 | MacLeod | G06F 21/6218 |
| 9,477,660 B2 * | 10/2016 | Scott | G06F 21/552 |
| 9,934,542 B2 * | 4/2018 | Chauhan | G06Q 50/265 |
| 2008/0134294 A1 * | 6/2008 | Mattox | G06F 21/6245 726/4 |
| 2008/0176203 A1 | 7/2008 | Kuntz et al. | |
| 2010/0275266 A1 * | 10/2010 | Jakobson | G06F 3/14 726/26 |
| 2010/0333165 A1 | 12/2010 | Basak et al. | |
| 2012/0151553 A1 | 6/2012 | Burgess et al. | |
| 2013/0097203 A1 * | 4/2013 | Bhattacharjee | G06F 21/604 707/783 |
| 2013/0298248 A1 * | 11/2013 | Boldrev | G06F 21/6245 726/26 |
| 2014/0096244 A1 | 4/2014 | Calcaterra et al. | |
| 2015/0013013 A1 * | 1/2015 | Li | G06F 21/60 726/26 |
| 2015/0220365 A1 | 8/2015 | Calcaterra et al. | |
| 2016/0088019 A1 * | 3/2016 | Li | G06F 21/53 726/1 |
| 2016/0182526 A1 * | 6/2016 | Underwood | H04W 4/21 726/28 |

OTHER PUBLICATIONS

Amazon, "Amazon Echo: Always Ready, Connected, and Fast," Amazon Devices, p. 1-6, Amazon.com Inc., http://www.amazon.com/Amazon-SK705DI-Echo/dp/BOOX4WHP5E, Accessed on Sep. 30, 2015.
Ghostery, "Take control of your digital experience," Ghostery Home Page, p. 1-4, Ghostery Inc., https://www.ghostery.com/en/, Accessed on Sep. 30, 2015.
Graziano, "Disable this feature to stop your Samsung Smart TV from listening to you," CNET How to, Feb. 10, 2015, p. 1-2, CBS Interactive Inc., http://www.cnet.com/how-to/samsung-smart-tv-spying/, Accessed on Sep. 30, 2015.
Sharma et al., "Different Firewall Techniques: A Survey," 5th ICCCNT, Jul. 11-13, 2014, p. 1-6, IEEE, Hefei, China.
IBM: List of IBM Patents or Patent Applications Treated as Related (Appendix P), Nov. 2, 2015, pp. 1-2.
Pending U.S. Appl. No. 14/870,690, titled "Data Security System," filed on Sep. 30, 2015, pp. 1-30.

* cited by examiner

DATA SECURITY SYSTEM

TECHNICAL FIELD

The present invention relates to attributes of data, and more particularly to securing certain data from requesters.

BACKGROUND

In addition, in the digital age, devices and objects, such as computing devices and memory come in all shapes, sizes, and colors. Most people store vast amounts of information in digital space, between their personal computers, handheld devices, the cloud and other digital storage means. This has led to a new wave of theft involving hacking into personal accounts, personal files, and retrieving private, and sometimes very valuable data. However, one does not need to be hacked to have their privacy infringed on. Many companies nowadays access and store everyday data, and whereabouts of users, which can also be unsettling for some people.

SUMMARY

The present invention provides a method, system, and computer program product for managing a response to a query. A computer identifies one or more privacy settings. The computer receives a query for information. The computer determines whether a response to the query satisfies the one or more privacy settings. If the computer determines that the response to the query does not satisfy the one or more privacy settings, the computer alters the response to satisfy the one or more privacy settings.

DETAILED DESCRIPTION

Embodiments of the present invention will now be described in detail with reference to the accompanying Figures.

Figure 1:
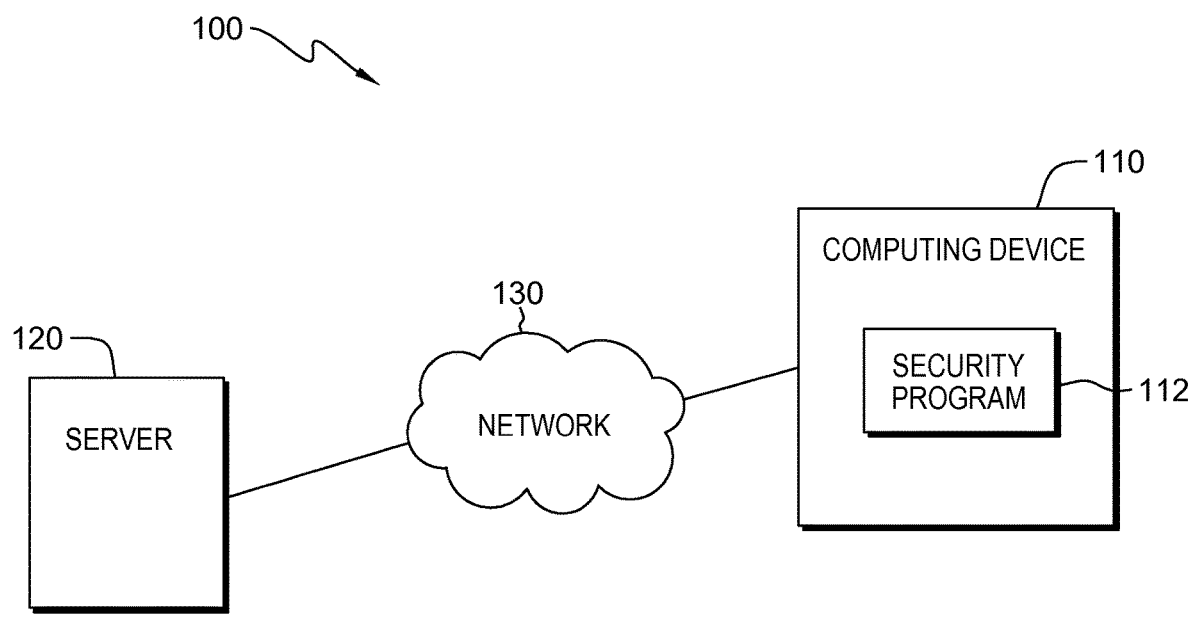
FIG. 1 illustrates a data security system, in accordance with an embodiment of the invention.

FIG. 1 illustrates data security system 100, in accordance with an embodiment of the invention. In an exemplary embodiment, data security system 100 includes server 120 and computing device 110 interconnected via network 130.

In the exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between server 120 and computing device 110.

Server 120 may be a desktop computer, a notebook, a laptop computer, a tablet computer, a handheld device, a smart-phone, a thin client, or any other electronic device or computing system capable of receiving and sending data to and from other computing devices, such as computing device 110 via a network, such as network 130. Although not shown, optionally, server 120 can comprise a cluster of web devices executing the same software to collectively process requests. Server 120 is described in more detail with reference to FIG. 3.

Computing device 110 includes security program 112. Computing device 110 may be a desktop computer, a notebook, a laptop computer, a tablet computer, a handheld device, a smart-phone, a thin client, or any other electronic device or computing system capable of receiving and sending data to and from other computing devices, such as server 120 and computing device 110, via a network, such as network 130. Although not shown, optionally, computing device 110 can comprise a cluster of web devices executing the same software to collectively process requests. Computing device 110 is described in more detail with reference to FIG. 3.

In the example embodiment, security program 112 is a program capable of determining privacy settings on computing device 110. In addition, security program 112 is capable of updating privacy settings based on user input, user behavior (such as the manner in which computing device 110 is utilized), and additional privacy setting updates and changes. In the example embodiment, security program 112 is capable of receiving a query from a user via a user interface, or from another program that may be local or on another computing device, such as server 120. Security program 112 is also capable of determining a response to the query and further determining whether the response (and also the query) complies with the privacy settings of computing device 110. Security program 112 is further capable of altering the response to the query in order to comply with the privacy settings of computing device 110. The operations and functions of security program 112 are described in more detail with reference to FIG. 2.

Figure 2:
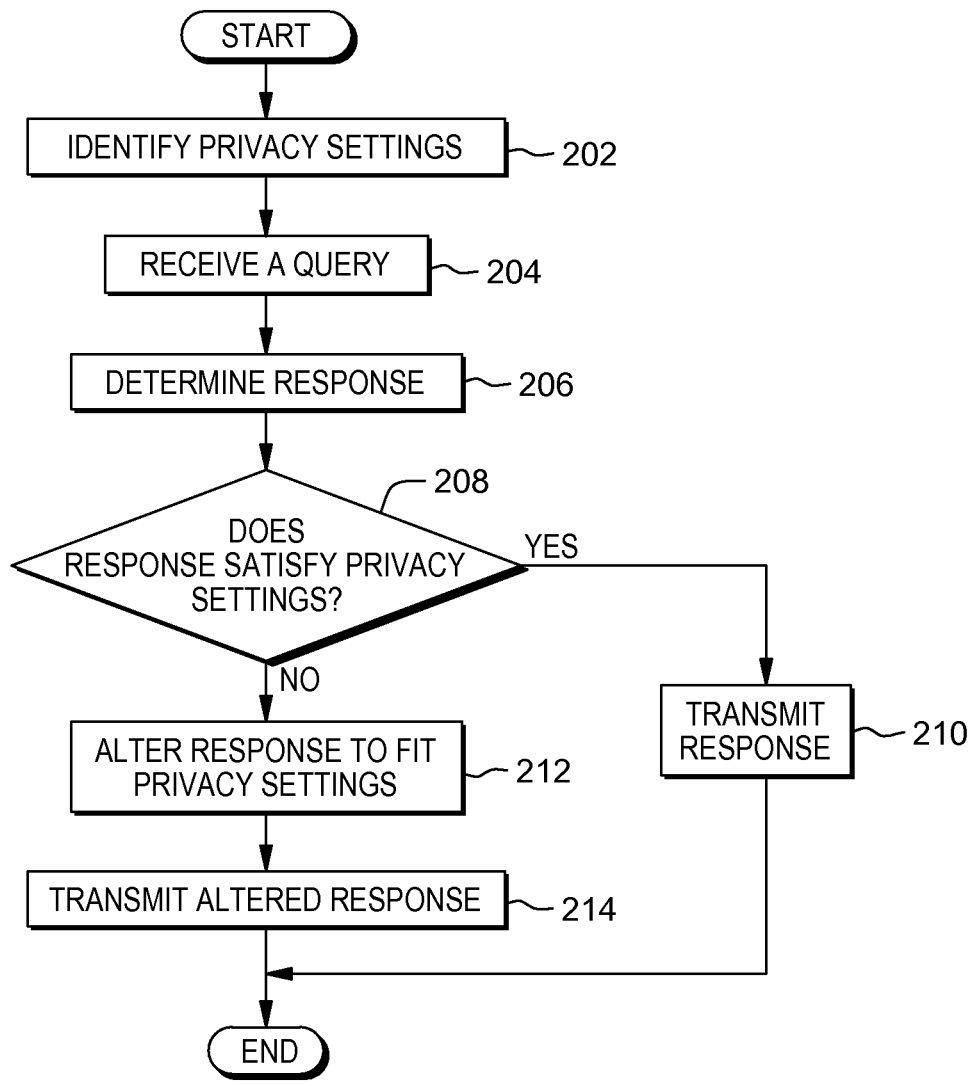
FIG. 2 is a flowchart illustrating the operations of the security program of FIG. 1, in accordance with an embodiment of the invention.

FIG. 2 is a flowchart illustrating the operations of security program 112 in providing a response to a query that complies with privacy settings on computing device 110, in accordance with an embodiment of the invention. In the example embodiment, security program 112 identifies privacy settings on computing device 110 (step 202). In the example embodiment, security program 112 determines privacy settings in place for other programs and applications, such as for the social media account(s) for the user of computing device 110, privacy setting for the web browsers present on computing device 110, and in addition general privacy settings in place for computing device 110. Additionally, security program 112 may determine privacy settings for additional programs, applications, and computing devices other than those listed above. In the example embodiment, security program 112 determines commonalities between settings in order to create an overall set of privacy settings. In other embodiments, security program 112 combines privacy settings for all applications, programs, computing devices in determining an overall set of privacy settings. For example, if program 1 has privacy setting 1 and privacy setting 2, while program 2 has privacy setting 2 and privacy setting 3, security program 112 combines privacy settings so that the overall set of privacy settings contain privacy setting 1, privacy setting 2 and privacy setting 3. In further embodiments, if certain privacy settings for a first application contradict privacy settings for a second application, the user may be prompted to determine which setting is desirable. In an alternative to this further embodiment, security program 112 may determine which application is utilized more frequently. If the first application is utilized more frequently, security program 112 includes the privacy settings corresponding to the first application in the overall privacy settings. In another alternative to this further embodiment, security program 112 may determine if the frequency of utilization of the first and/or second application exceed a threshold value. For example, if the frequency of utilization of either the first but not the second application exceed the threshold value, security program 112 includes the privacy setting corresponding to the first application in the overall privacy settings. Furthermore, if the frequency of utilization of either the first and second both exceed the threshold value or both do not exceed the threshold value, security program 112 may prompt the user of computing device 110 for input regarding the proper privacy setting to include in the overall privacy settings. In additional embodiments, security program 112 may determine privacy settings based on specific incidents determined by analyzing user history (which may also occur at specific times). For example, if a first location has been allowed to be shared 50 times by a user during work hours, and not allowed to be shared 100 times by the user after works hours, security program 112 may determine that the user of computing device does not want user location to be shared when the user is in the first location after work hours. Furthermore, security program 112 may determine privacy settings based on certain locations, products and/or applications. For example, security program 112 may determine a "brick and mortar" privacy setting for all queries from applications associated with "brick and mortar" establishments, such as supermarkets, department stores and the like. In even further embodiments, security program 112 may identify the privacy settings of computing device 110 based on the privacy settings of the network computing device 110 is connected to. For example, the privacy settings of the network may be integrated into the privacy settings existing on computing device 110 or in some cases even take the place of privacy settings existing on computing device 110. In addition, security program 112 may have differing privacy settings for different data (for example, a first data may be more sensitive than a second data and therefore has more strict privacy settings).

Furthermore, security program 112 may alter the overall privacy settings based on the use of computing device 110 by the user of computing device 110. For example, security program 112 may monitor or communicate with the operating system of computing device 110 with regard to the use of computing device 110. If the monitored use contradicts the current privacy settings, security program 112 may determine if the amount of contradictory use exceeds a threshold value. If in fact the threshold value is exceeded, security program 112 may monitor all or a portion of the privacy settings in order to mesh with the use of computing device 110 by the user of computing device 110. It is important to note, that in the example embodiment, the privacy settings are associated with specific users, therefore, if security program 112 monitors and tracks the use of computing device 110, security program 112 does so with respect to each user.

Security program 112 receives a query (step 204). In the example embodiment, security program 112 receives a query from another computing device, such as server 120 via network 130. In other embodiments, security program 112 receives a query from a user via a user interface located on computing device 110 (which may be a request to retrieve location information or information present on another computing device or database). In further embodiments, security program 112 may receive a query from another application located on computing device 110, for example via an application programming interface (API). In the example embodiment, the query may include a request for information, such as a request for location related information. For example, the query may be a request by a supermarket application located on computing device 110 requesting location related information of the user of computing device 110.

Security program 112 determines a response to the query (step 206). In the example embodiment, security program 112 determines a response to the query by utilizing natural language processing techniques (in the case of user input), keyword comparison, string matching techniques or similar processing means. In other embodiments, a structured application programming interface may be utilized where a query is received in a certain format such as: "sensor name, operation(type of data)" In the example embodiment, security program 112 also communicates with the operating system in order to determine a response to the query. Furthermore, security program 112 references may reference a database which may, for example, contain information related to the user of computing device 110. In other embodiments, security program 112 may communicate with other applications via an application programming interface (API) in order to determine a response to the query, or reference data located on computing device 110. For example, if the query pertains to the whereabouts of the user of computing device 110 at a specific time, security program 112 may reference a calendar application located on computing device 110 in order to determine a response to the query.

Security program 112 determines whether the response to the query satisfies the privacy settings (decision 206). In the example embodiment, security program 112 compares the response to the query (and each piece of information contained within the response) to determine whether the response to the query satisfies the privacy settings of computing device 110. For example, if a query from a supermarket app asks for details regarding location information of the user for the purposes of targeted advertising, a typical response may be to transmit all location information of the user, possibly transmitted at real-time. However, if security program 112 determines that the privacy settings detail to not release GPS (global positioning system) information of the user of computing device 110, security program 112 determines that the response to the query does not satisfy the privacy settings.

If security program 112 determines that the response to the query satisfies the privacy settings (decision 206, "YES" branch), security program 112 transmits the response to the other computing device via network 130, or displays the response to a user (who submitted the query) via a user interface.

If security program 112 determines that the response to the query does not satisfy the privacy settings (decision 206, "NO" branch), security program 112 alters the response to fit the privacy settings (step 212), and transmits the altered response to the other computing device via network 130, or displays the response to a user (who submitted the query) via a user interface (step 214). Referring to the example above, if a query from a supermarket app asks for details regarding location information of the user for the purposes of targeted advertising, a typical response may be to transmit all location information of the user, possibly transmitted at real-time. However, if security program 112 determines that the privacy settings detail to not release GPS information of the user of computing device 110, security program 112 alters the response and only transmit location information of the user when the user is in the relevant supermarket. Therefore, the user of computing device 110 may continue to receive any desired marketing, such as coupons, from the supermarket app, however, the supermarket app does not have all or constant location information of the user.

In another example, if a medical professional, such as a doctor, would like to prescribe a medication to the user of computing device 110, the doctor may typically reference the medical records of the user (the entirety of the records) in order to determine if there are any current medications being taken that may pose a potential conflict. However, if security program 112 determines that the privacy settings detail to not release non-pertinent medical information, security program 112 may request that the doctor input a query via a user interface to security program 112. For example, the doctor may input a list of chemicals contained in a medication, or input the medication desired to be prescribed. Security program 112 may utilize natural language processing techniques to analyze the input and reference medical journals via network 130 in order to determine the chemical composition of the medication. Security program 112 may then reference the medical records of the user of computing device 110 in order to determine any current medications or medical conditions/allergies, and to also determine whether any current medications or medical conditions/allergies may conflict with the medication the doctor desires to prescribe. In the example embodiment, security program 112 displays a response to the query, for example, a "yes" or "no" or specific information related to the existence of a conflict. In other embodiments, security program 112 may respond with a list of chemical compound contained in the medications currently being taken by the user of computing device 110 (or a list of current medications) so that the doctor can determine whether any of the chemical compounds (and in turn any medications) potentially pose a conflict.

In other embodiments, security program 112 may determine whether the query (rather than the response) satisfies the privacy settings. For example, as stated above, if security program 112 determines that the privacy settings of computing device 110 detail to not release GPS information of the user of computing device 110 and a supermarket app asks for details regarding location information of the user of computing device 110, security program 112 compares the query to the privacy settings and determines whether the privacy settings allow for the query to be answered. If security program 112 determines that the privacy settings do not allow the query to be answered, the security program 112 does not respond to the query (or responds stating that the query cannot be answered) or responds to the query stating that the query requests information that may not be disseminated. In other embodiments, security program 112 may respond with another query, for example, asking why the information is required or what the information will be used for, in order to determine the underlying reason for the request. In this example, if the underlying reason is determined to be that the supermarket app would like to know location information of the user of computing device 110 in order to send personalized coupons to the user, security program 112 may respond with location information only when the user of computing device 110 is within a certain vicinity of the relevant supermarket. In this embodiment, security program 112 may communicate with a GPS module present on computing device 110, in order to determine the location of the user of computing device 110.

In further embodiments, based on the privacy settings, security program 112 may require certain information prior to proceeding whether to respond to any potential inquiries. For example, for a potential advertisement for a "brick and mortar" application, such as a supermarket, security program 112 may require that the product potentially being advertised be disclosed prior to another further inquiry. If a particular box of cereal is disclosed, security program 112 may determine, by referencing credit card and purchase information, how often the product has been purchased within a certain period of time. If the amount of times the product has been purchased over the certain period of time is above a threshold, security program 112 may allow a query, such as a query regarding the user's location or may allow the supermarket application to present the advertisement to the user of computing device 110.

In another illustrative example, security program 112 may govern privacy/security policies associated with a network, such as for example, an employee network. In many instances, a customer visiting a corporation may connect to a different network connection that employees of the corporation. Security program 112 may have certain privacy settings in place for the employee network and different privacy settings in place for the customer network. In addition, security program 112 may further identify a customer connecting to the customer network in order to determine if the customer has clearance to access certain sensitive information (for example, if the customer has signed a non-disclosure agreement). In the example embodiment, security program 112 references employer databases in order to determine whether the customer is eligible to any access privileges. In other words, if security program 112 receives a query from a customer device via a customer network for access to certain information, security program 112 respond with information that may not be released to other customers (if security program 112 determines that the customer is allowed access to the information).

In a further illustrative embodiment, security program 112 may analyze the query and determine what information is necessary to satisfy the request. For example, a company may have a confidential document that contains information about a customer project including a list of products that will be used by a customer along with pricing and terms and conditions information. Security program 112 may analyze the query and determine that the request only pertains to the number of times a specific product/solution was offered by the company, and therefore, security program 112 may respond with only the necessary information rather than providing access to the entire confidential document (along with the pricing and terms and conditions information contained within). As illustrated by the example, security program 112 may analyze raw data (i.e., the confidential document) and extract information necessary for the query rather than presenting the entirety of the raw data as a response to the query. By doing so, security program 112 is able to protect potentially sensitive information (i.e., the pricing and terms and conditions information) from being released.

Furthermore, security program 112 may be located on a separate computing device or coupled with a computing device (such as a supercomputer) capable of analyzing queries and determining a response for the query. In this embodiment, security program 112 may receive a query and transmit the query along with the appropriate (or all) privacy settings to the analyzing computing device. In other embodiments, security program 112 may instead analyze a response to a query created by the analyzing computing device in order to determine whether the response satisfies the privacy settings. If the privacy settings are not satisfied, security program 112 may communicate with the analyzing computing device, and notify the analyzing computing device why the privacy settings are not satisfied. This communication may include potential solutions (such as specifying the type of response that will satisfy the privacy settings), appropriate privacy settings (such as the privacy settings violated by the response), and the like. Therefore, the analyzing computing device can determine an appropriate response that satisfies the privacy settings.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
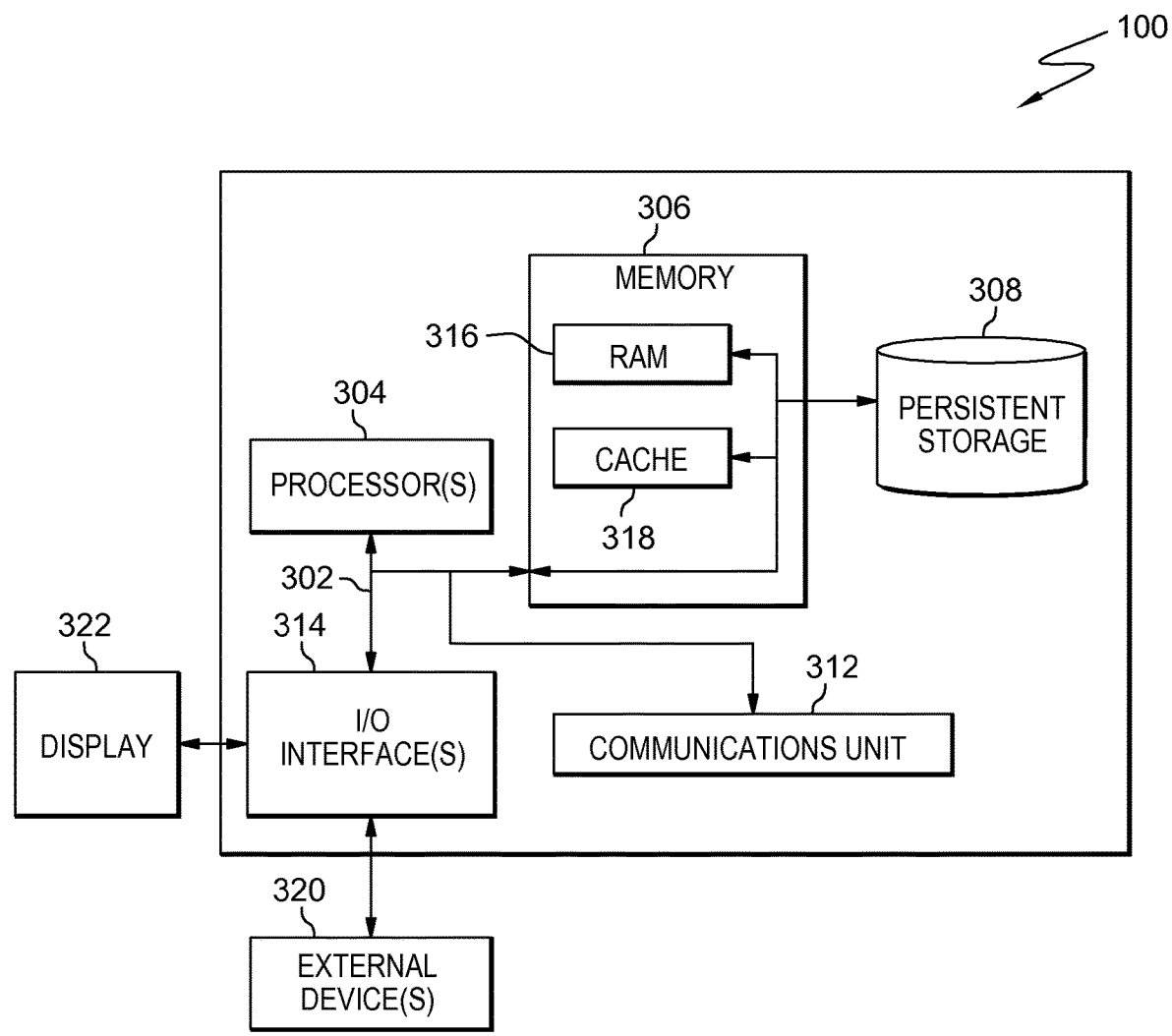
FIG. 3 is a block diagram depicting the hardware components of the data security system of FIG. 1, in accordance with an embodiment of the invention.

FIG. 3 depicts a block diagram of components of computing device 110 and server 120 of data security system 100 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and server 120 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

Security program 112 in computing device 110 may be stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Security program 112 in computing device 110 may be downloaded to persistent storage 308 through communications unit 312.

I/O interface(s) 314 allows for input and output of data with other devices that may be connected to computing device 110 and server 120. For example, I/O interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., security program 112 in computing device 110, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a response to a query for information via a user interface, one or more applications, or a computer device, comprising the steps of:
    a computer determining one or more privacy settings for a user, wherein the one or more privacy settings are determined by analyzing a usage history, of the user, of the one or more applications;
    the computer determining that the user is utilizing the one or more applications in a manner that contradicts the one or more privacy settings as determined based on the usage history of the user;
    the computer determining that an amount of utilization, of the user, of the one or more applications a plurality of times, in the manner that contradicts the one or more privacy settings, exceeds a threshold amount of contradictory use;
    based on the amount of utilization, of the user, in the manner that contradicts the one or more privacy settings, exceeding the threshold amount of contradictory use; the computer altering the one or more privacy settings;
    the computer receiving an electronic query for information;
    the computer determining whether a response to the query satisfies the one or more privacy settings; and
    responsive to determining that the response to the query does not satisfy the one or more privacy settings, the computer altering the response to satisfy the one or more privacy settings.

2. The method of claim 1, further comprising:
responsive to determining that the response to the query does satisfy the one or more privacy settings, the computer transmitting the response.

3. The method of claim 1, further comprising:
responsive to determining that the response to the query does not satisfy the one or more privacy settings, the computer transmitting the altered response.

4. The method of claim 1, wherein the step of determining whether a response to the query satisfies the one or more privacy settings further comprises:
the computer analyzing the query by utilizing one or more of natural language processing techniques, keyword comparisons, and string matching techniques;
the computer determining a response based on the analysis of the query; and
the computer comparing information in the response to the one or more privacy settings.

5. The method of claim 1, wherein the step of the computer identifying one or more privacy settings further comprises:
the computer determining a first privacy setting exists on a first application;
the computer determining a second privacy setting exists on a second application, wherein a frequency of utilization of the second application is higher than the first application; and
the computer adding the second privacy setting into the one or more privacy settings.

6. The method of claim 1, wherein a first setting of the one or more privacy settings applies to a first data and a second setting of the one or more privacy settings applies to a second data.

7. The method of claim 1, wherein analyzing the usage history, by the user, of the one or more applications comprises:
the computer tracking past behavior of the user, wherein past behavior comprises a manner of use of the one or more applications, on the computer, by the user.

8. The method of claim 1, further comprising:
the computer updating the one or more privacy settings for the user in response to a manner in which the computer is utilized by the user.

9. The method of claim 1, further comprising:
determining one or more privacy settings utilized by each of the one or more applications;
determining one or more general privacy settings utilized by a computing device hosting the one or more applications; and
determining an overall set of privacy settings for the user of the computing device, wherein the overall set of privacy settings comprises a set of privacy settings common between the one or more privacy settings utilized by each of the one or more applications and the one or more general privacy settings utilized by the computing device hosting the one or more applications.

10. The method of claim 9, wherein the overall set of privacy settings for the user comprises the one or more privacy settings utilized by each of the one or more applications combined with the one or more general privacy settings utilized by the computing device hosting the one or more applications.

* * * * *